United States Patent [19]

Lang

[11] 4,107,999
[45] Aug. 22, 1978

[54] AUTOMATIC OIL LEVEL MAINTAINING SYSTEM

[75] Inventor: James R. Lang, Littleton, Colo.

[73] Assignee: The Mechanex Corporation, Denver, Colo.

[21] Appl. No.: 801,590

[22] Filed: May 31, 1977

Related U.S. Application Data

[62] Division of Ser. No. 709,441, Jul. 28, 1976, Pat. No. 4,091,894.

[51] Int. Cl.² ............................................. G01F 23/02
[52] U.S. Cl. ......................................................... 73/326
[58] Field of Search ................... 73/325, 326, 330, 334

[56] References Cited

U.S. PATENT DOCUMENTS

| | | | |
|---|---|---|---|
| 1,207,635 | 12/1916 | Rushton | 73/326 |
| 1,925,145 | 9/1933 | Lank | 73/326 |
| 2,707,396 | 5/1955 | Du Pure | 73/326 |
| 3,046,785 | 7/1962 | Au Werter | 73/325 |
| 4,050,305 | 9/1977 | Evans et al. | 73/326 |

FOREIGN PATENT DOCUMENTS 977,900  12/1964  United Kingdom ..................... 73/325

Primary Examiner—Daniel M. Yasich
Attorney, Agent, or Firm—Thomas E. Torphy; James R. Hagen

[57] ABSTRACT

A system for maintaining a desired level of fluid in a sump, such as maintaining a desired level of oil in the crankcase of an internal combustion engine, is provided with an oil reservoir having a cap which assures sealing of the fluid inlet of the reservoir, an outlet valve with a tiltable operator rod which provides assurance oil will not flow from the reservoir when the inlet cap is removed and which facilitates the addition of oil to the reservoir through the inlet and a sight gauge having guard members which assure the structural integrity of the sight gauge.

4 Claims, 10 Drawing Figures

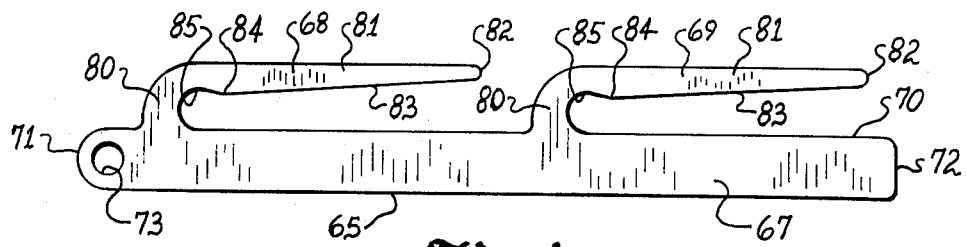
Fig. 4
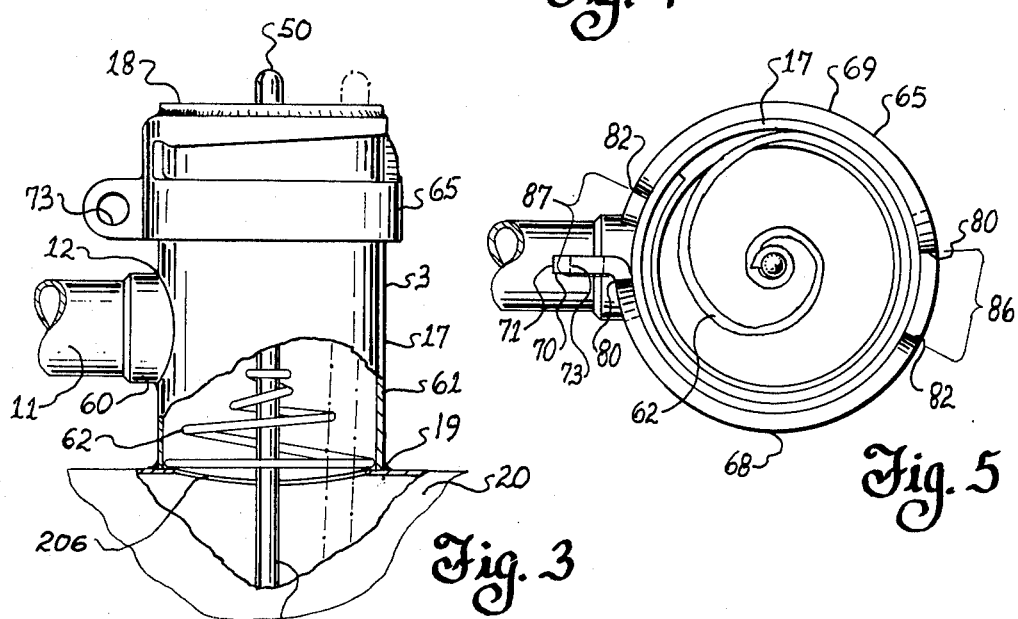
Fig. 3
Fig. 5
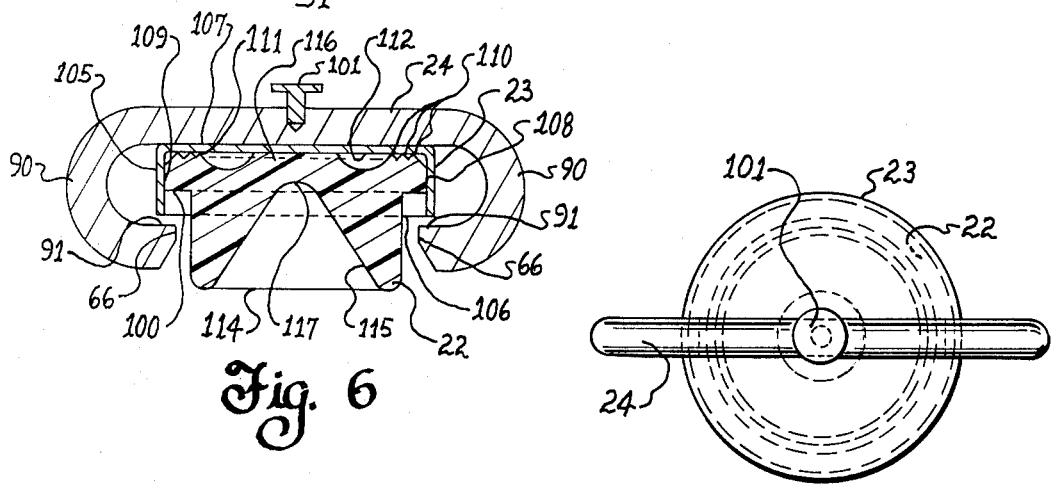
Fig. 6
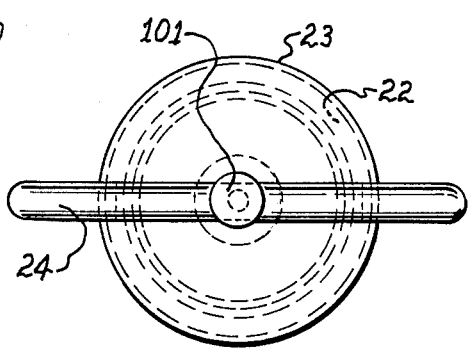
Fig. 7

AUTOMATIC OIL LEVEL MAINTAINING SYSTEM

This is a division, of application Ser. No. 709,441, filed July 28, 1976, now Pat. No. 4,091,894.

BACKGROUND OF THE INVENTION

This invention relates to improvements in gravity operated fluid flow systems designed to assure the presence of an adequate level of a fluid in a sump, such as a desired level of oil in the crankcase of an internal combustion engine.

U.S. Pat. No. 3,777,852 entilted "Automatic Oil Level Regulator" and assigned to the parent company of the assignee of this invention shows a prior art system having a reservoir of which the inventive features of this disclosure constitute an improvement.

Gravity flow oil level regulators generally consist of an air tight reservoir for containing a supply of oil, a supply conduit for conducting oil from the reservoir to the engine crankcase and an air carrying sensing conduit having an end located at the desired oil level in the crankcase and another end located above the level of oil in the reservoir. The reservoir must be positioned at a higher level than the crakcase to provide gravity induced fluid flow from the reservoir to the crankcase.

At its desired level in the crankcase, oil seals the end of the sensing conduit in the crankcase. When the oil falls below the desired level the end of the sensing conduit is no longer sealed and air passes through the conduit to an air chamber or ullage above the oil level in the reservoir.

The air flow through the sensing conduit relieves a partial vacuum induced in the reservoir air chamber by gravitational forces acting on the oil in the supply conduit. Consequently, oil flows downwardly through the supply conduit and into the crankcase until the end of the conduit in the crankcase is once again covered by oil, which prevents air from entering the line. Oil flow continues until a partial vacuum is again formed in the air chamber above the oil in the reservoir. Flow through the supply line ceases when the force of the partial vacuum above the oil level in the reservoir equals the gravitational forces inducing the oil to flow downwardly through the oil supply conduit.

When the oil level in the crankcase again falls below or unseals that end of the sensing conduit which is in the crankcase the above cycle will be repeated.

SUMMARY OF THE INVENTION

This invention relates to features of fluid reservoirs for automatic oil level regulating systems. A positive sealing cap assures that air will not leak into the oil reservoir through the oil inlet of the reservoir and allow unwanted oil to flow into the crankcase. An outlet valve in the reservoir assures sealing of the reservoir outlet when the cap is removed and facilitates addition of oil to the reservoir from the inlet while maintaining the outlet sealed. Guard members attached to end members of a sight gauge mounted on the reservoir assure structural integrity of the sight gauge during shipment, installation, and use of the reservoir.

BRIEF DESCRIPTION OF THE DRAWINGS

FIG. 3 is an enlarged elevational view of the inlet tube of the reservoir of FIG. 1, having a cut-away portion;

FIG. 4 is a plan view of a cam for maintaining closure means in sealing engagement with the oil inlet of the reservoir and is shown in this view prior to its placement on the inlet tube;

FIG. 5 is a plan view of the inlet of the reservoir, as shown in FIG. 3;

FIG. 6 is an enlarged full sectioned elevational view of the closure of this invention as shown in FIG. 1;

FIG. 7 is a plan view of the closure of FIG. 6;

DESCRIPTION OF THE PREFERRED EMBODIMENT

Figure 1:
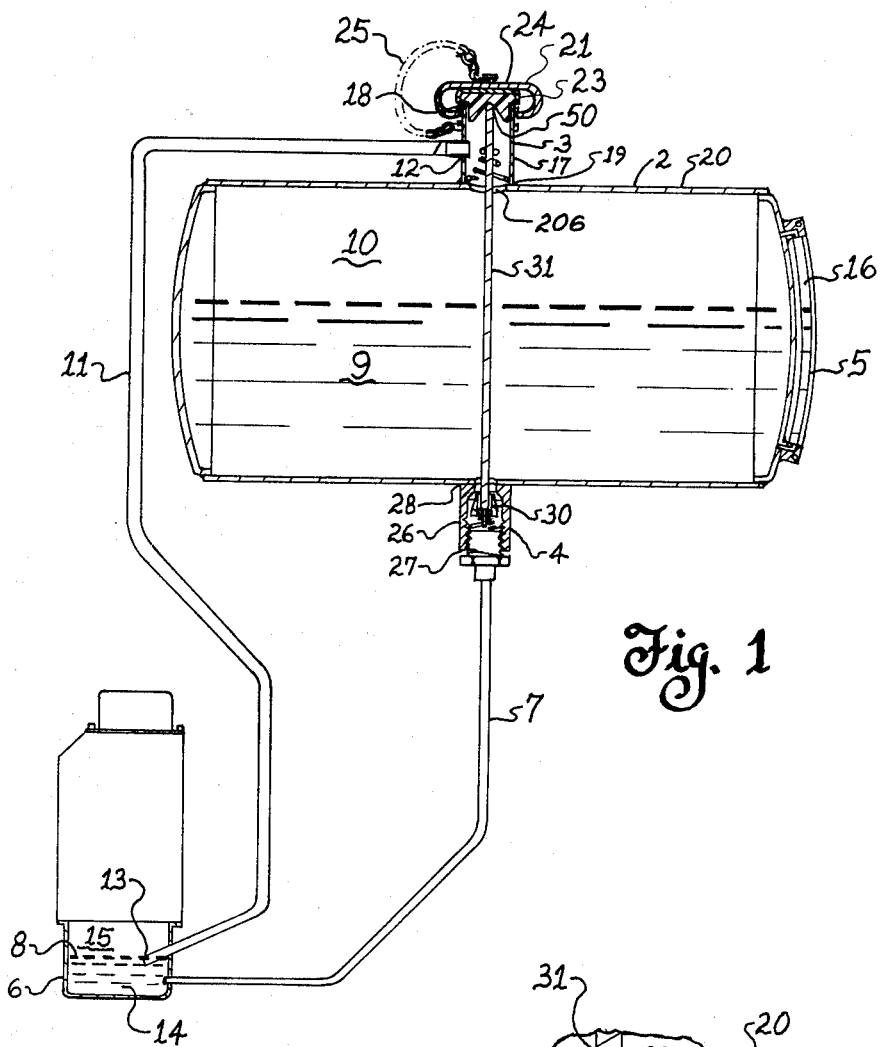
FIG. 1 is a schematic view of an oil level regulator system having a reservoir having the features of this invention.

In FIG. 1 an automatic oil level maintaining system containing the features of this invention is shown. Components of the system are an air tight oil reservoir 2 having an inlet 3, an outlet 4 and a sight gauge 5. Outlet 4 is in fluid flow communication with a fluid sump, such as engine crankcase 6, by means of an oil carrying or supply conduit 7. Conduit 7 terminates within crankcase 6 at a point below the desired oil level 8 in the crankcase.

Reservoir 2 is comprised of an oil containing lower portion 9 and an air containing upper portion or ullage 10. An air carrying or sensing conduit 11 is sealingly engaged with reservoir 2, such as at 12, and crankcase 6 and provides fluid flow communication between the crankcase 6 and the air containing portion 10 of reservoir 2. The terminal end 13 of conduit 11 is positioned as shown so that when the oil 14 is at its desired level 8 within crankcase 6 the oil just covers or seals the termination or end 13 of conduit 11 and thus prevents air present in chamber 15 above the desired oil level 8 in the crankcase from entering conduit 11 and flowing into portion 10 of reservoir 2 to relieve a partial vacuum which exists there in normal operation of the system under the conditions shown in FIG. 1.

Sight gauge 5 provides an external visual indication of the amount of oil contained by the oil containing portion 9 of reservoir 2. A component of gauge 5 is a transparent member, such as transparent plastic tube 16, which is sealingly connected to an upper and lower portion of the reservoir 2.

Inlet 3 consists of a cylindrical tubular member 17 having an upper or first end 18 and a lower or second end 19. End 19 is sealingly secured to the wall 20 of reservoir 2 by means such as welding or brazing. End 18 is sealed by removable closure member 21 which consists of a resilient seal member 22, a rigid cap member 23 and a retention member 24. A flexible cap tether, such as chain 25, is attached to each the inlet tube and the retention member to aid in preventing misplacement of the removable closure member 21 upon its removal from the inlet, such as when oil is to be added to the reservoir or when oil is to be changed in the crankcase.

Inlet 3 is in fluid flow communication with the oil and air containing portions 9 and 10 of reservoir 2 by means of opening 206 in wall 20 of the reservoir.

Outlet 4 consists of a cylindrical tubular member 26 having a lower or first end 27 and an upper or second end 28. End 28 is sealingly engaged with a portion of wall 20 of reservoir 2 by means such as welding or brazing. End 27 is sealingly engaged with oil supply conduit 7.

An opening 29 provides fluid flow communication between the oil containing portion 9 of reservoir 2 and the outlet 4. A valve assembly 30 is positioned within tubular member 26 and is in axial alignment with opening 29. Valve actuator means, such as push or operator rod 31, extends through each opening 206 and 29 in wall 20 of reservoir 2. As is described in greater detail below, the closure 21 coacts with valve assembly 30 via push rod 31 so that the valve 30 is open and allows flow from the reservoir into the outlet when the closure is on the inlet and is closed to prevent fluid flow between the reservoir and the outlet when the closure is removed from the inlet.

Figure 2:
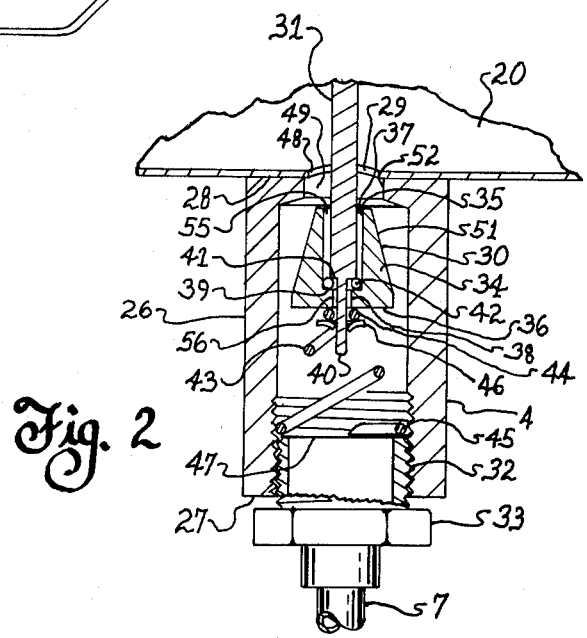
FIG. 2 is an enlarged view of the outlet portion of the reservoir shown in FIG. 1.

Referring to FIG. 2 the outlet 4 and valve assembly 30 of FIG. 1 are shown in an enlarged detail view in which tubular member 26 is shown, by convention, welded about the periphery of its upper or second end 28 to wall 20 of the reservoir and oil supply conduit 7 is shown connected to an interior bore 32 of tubular member 26 by threaded member 33.

Valve assembly 30 consists of a generally frusto-conical valve body 34 having a first or smaller end 35, a second or larger end 36, a first or larger bore 37 extending along the longitudinal axis of the valve body from first end 35 toward second end 36, a second or smaller bore 38 extending along the longitudinal axis of the valve body from the second end 36 toward the first end 35 and a radially extending surface or shoulder 39 which forms a transition between bore 37 and bore 38.

A reduced portion 40 of push rod 31 extends through bore 38 of valve body 34 and extends beyond end 36 of valve body 34. A radially extending surface or shoulder 41 forms a transition between reduced portion 40 of push rod 31 and the normal diameter of push rod 31.

A resilient seal member, such as O-ring 42 is positioned between shoulder 39 on valve body 34 and shoulder 41 on push rod 31 to prevent fluid flow between the shoulders.

Biasing means, such as spirally wound coil spring 43, having a small end 44 which is positioned over reduced portion 40 of push rod 31 and a large end 45 is positioned within bore 32 of member 26. The small end 44 is positioned about the reduced portion 40 of push rod 31 and adjacent end 36 of valve body 34 and a retention means, such as a well known uni-directional retainer 46, is positioned to maintain the small end 44 of coil spring 43 entrapped between the retainer 46 and end 36 of valve body 34 and to maintain resilient O-ring 42 in sealing engagement with each shoulder 39 and shoulder 41.

Large end 45 of spring 43 is sized to fit adjacent the surface of bore 32 and is prevented from axial movement downward by an end 47 of threaded member 33.

In the position shown in FIG. 2 the spring 43 is in compression and is therefore urging valve assembly 30 axially upwardly toward a valve port 48 formed by a reduced bore portion 49 of bore 32 and by opening 29 in wall 20.

Referring to FIG. 1 it will be seen that the presence of closure 21 on inlet 3 prevents upward movement of push rod 31, which is a part of valve assembly 30. Therefore, while the closure is in position on the inlet 3 the valve remains open as shown in FIG. 2 and oil can flow through port 48, bore 32 and conduit 7 to crankcase 6.

However, when closure 21 is removed from inlet 3 the upper end 50 of push rod 31 is no longer restrained from axial upward movement and the spring 43 biases valve assembly 30 upwards so surface 51 of frusto-conical member 34 sealingly engages a continuous annular portion of surface 52, which defines valve port 48. Consequently, oil flow through port 48 is prevented.

Closure 21 is generally removed from inlet 3 to enable the addition of oil through the inlet into the reservoir. As removal of closure 21 breaks the partial vacuum existing in portion 10 of reservoir 2 the only preventative to the added oil flowing to crankcase 6 is valve body 34 sealing port 48.

To aid in preventing the inadvertent depression of end 50 of push rod 31 and thus the opening of the valve it is desirable to push the rod 50 of rod 31 to the side of inlet 3, as shown in phantom lines in FIG. 3. To prevent unseating of valve body 34 from port 48 by so positioning the push rod the push rod receiving bore 37 of valve body 34 is larger than the outside diameter of the push rod to form a continuous clearance, such as annular gap 55, as shown in FIG. 2. Also, bore 38 in valve body 34 is larger than the outside diameter of reduced portion 40 of push rod 31 to form a continuous clearance, such as annular gap 56.

Annular gaps 55 and 56 provide sufficient clearance to enable the push rod to assume a skewed position with respect to the bores without disturbing the seal between surface 51 of valve body 34 and surface 52 of valve port 48.

O-ring 42 is resilient and compressed between the shoulders 32 and 41. The O-ring decreases in thickness between those portions of the surfaces 39 and 41 which are forced slightly closer together and expands to fill the slight additional distance created as a result of opposite portions of the surfaces 39 and 41 being forced farther apart by the skewed position of the push rod relative to the bores 37 and 38 resulting from forcing the end 50 of push rod 31 to a side of inlet 3 as shown in FIG. 3. Thus, oil is prevented from flowing from the reservoir and the mechanic adding the oil to the reservoir has greater assurance that the end of the spout of the means he is using to add the oil, such as a can spout or hose spout, does not depress the push rod to open the valve, which would often result in an undesirable level of oil in the crankcase.

Coil spring 43 serves to maintain the valve assembly 30 in axial alignment with valve port 48.

FIG. 3 shows a partially cut-away elevational view of the inlet 3 of the reservoir shown in FIG. 1, in which the closure or cap 21 of FIG. 1 has been removed to enable push rod 31 to more axially upwardly to close valve 30 and force end 50 of push 31 to protrude above end 18 of cylindrical member 17 of the inlet. End 19 of member 17 is shown sealingly engaged, as by welding, with wall 20 of the reservoir.

A threaded fitting 60 extends through the wall 61 of member 60 and air carrying conduit 11 is sealingly engaged with fitting 60 to provide fluid flow communication between the reservoir and the crankcase.

A spirally wound coil spring 62 surrounds a portion of push rod 31 and seats within the bore of tubular member 17 on a ledge formed by wall 20 of the reservoir which surrounds opening 206. The coil spring 62 serves to maintain the push rod 31 centered along the longitudinal axis of member 17 but offers little resistance when a mechanic manually moves the end 50 of push rod 31 to a side of the inlet, as shown in phantom.

A cam member 65 is wrapped around a portion of the exterior surface of member 17 adjacent end 18 and rigidly affixed to member 17 by conventional means, such as welding or brazing. Cam member 65 coacts with end portions 66 of retention member 24, shown in FIG. 6, of closure 21 to maintain the closure in sealing engagement with end 18 of the inlet 3.

FIG. 4 shows the layout of cam member 65 before it is wrapped around member 17, as shown in FIGS. 3 and 5. Cam member 65 consists of a base strip 67 having two cam members 68 and 69 attached to a top edge 70. Base strip 67 has a first end 71 and a second end 72. An opening 73 is provided adjacent end 71 for attachment of the closure tether 25 shown in FIG. 1.

Cam members 68 and 69 are of identical configuration. Each has an attachment portion 80 extending substantially perpendicular to the top edge 70 of base strip 67 and a cam portion 81 attached to the attachment portion 80 and extending substantially parallel to top edge 70.

Each cam portion 81 has a terminal end 82 and an inclined surface 83 which extends from end 82 toward attachment portion 80 and which is farthest from edge 70 adjacent end 82 and closest to edge 70 at a point 84 intermediate end 82 and attachment portion 80. From point 84 to the attachment portion 80 a surface 85 inclines away from edge 70 to form a detente.

A gap 86, as indicated by bracketing, between terminal end 82 of cam member 68 and attachment portion 80 of cam member 69 is provided to permit entry of an end 66 of retention member 24.

Referring to FIG. 5, cam member 65 is shown formed around the exterior surface of cylindrical member 17 near end 18, as shown in FIG. 3.

Gap 86, as indicated by brackets, is formed between terminal end 82 of cam portion 68 and attachment portion 80 of cam portion 69. Diametrically opposite gap 86 of gap 87, as indicated by brackets, is formed between terminal end 82 of cam portion 69 and attachment portion 80 of cam portion 68. Adjacent end 71 of member 65 the strip 70 is bent outwardly to extend away from member 17 to expose opening 73 on each side to provide an attachment means for a closure tether 25 as shown in FIG. 1.

Cam member 65 is rigidly attached to member 17 by conventional means, such as welding or brazing.

FIG. 6 shows an enlarged sectional view of the closure 21 shown in FIG. 1. Closure 21, as previously described, consists of resilient seal member 22, rigid cap member 23 and retention member 24.

As best seen in FIG. 7, members 22 and 23 are annular and retention member 24 is a bar having each of its two end portions bent downwardly, as best seen in FIG. 6, to form a bight 90. Each bight terminates in an end 66 having a top surface 91 which engages one of the cam portions 68 or 69 of cam member 65 when the closure 21 is placed on end 18 of member 17 of inlet 3. Each of the ends 66 of retention member 24 is aligned with one of the gaps 86 or 87 and the closure is pushed axially downward on end 18 until an annular sealing shoulder 100 on resilient seal member 22 contacts end 18 of member 17.

Closure 21 is then turned clockwise causing surfaces 91 adjacent ends 66 of retention member 24 to engage inclined surfaces or cams 83. Continued clockwise turning causes closure member 21 to be cammed axially inwardly effecting an air tight pressure seal between end 18 and resilient shoulder 100. After ends 66 are turned beyond points 84 they are entrapped along inclined surface 85 and the axially upward urging of resilient member 22 maintains each end 66 locked along a surface 85 until the closure is turned counter clockwise with sufficient force to cause the ends 66 to pass points 84 whereby continued counter clockwise turning causes each of the ends 66 to be aligned with a gap 86 or 87, at which time the closure 21 may be removed from inlet 3 by an axial upward motion.

A tether pin 101 is provided on retention member 24 and tether 25, shown in FIG. 1 as a link chain, is attached between pin 101 and opening 73 on member 65 to assure the closure will not be misplaced when it is removed.

Cap 23 consists of a rigid annular, axially extending wall 105 having an open end 106 and a closed end 107. Resilient seal member 22 is preferably formed of an oil resistant synthetic rubber but it may be formed of any oil resistant resilient elastomeric material such as neoprene or polyurethane.

Resilient member 22 is inserted into the open end 106 of cap 23 and has a radially outwardly facing surface 108 which sealingly engages a continuous annular portion of a radially inwardly forcing surface 109 of cap 23. A series of concentric continuous circular seal ridges 110 are formed on a first end 111 of member 22 and these ridges sealingly engage an axially inwardly facing surface 112 of closed end 107 of cap 23.

An end 114 of resilient member 22 contains an inverted substantially conically or funnel shaped cavity 115 adapted to receive end 50 of push rod 31, as best shown in FIG. 1.

A support or bumper pad 116 of resilient material is disposed axially adjacent the deepest portion 117 of cavity 115 and rests against surface 112 to assure that the push rod 31 remains depressed to assure that the outlet valve assembly 30 is in the open position, as shown in FIG. 1, when closure 21 is placed on end 18 of inlet 3. Closure 21 assures airtight sealing of the inlet and prevents vibration induced loosening of the closure when the system is mounted on a vehicle.

Figure 8:
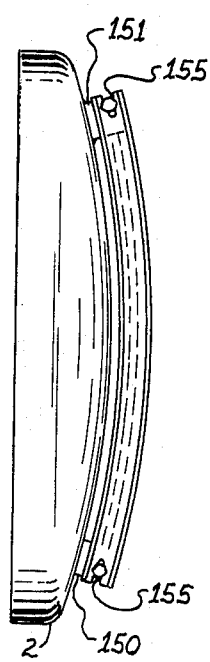
FIG. 8 is an enlarged elevational view of that end of reservoir to which the sight gauge is attached in FIG. 1.
Figure 9:
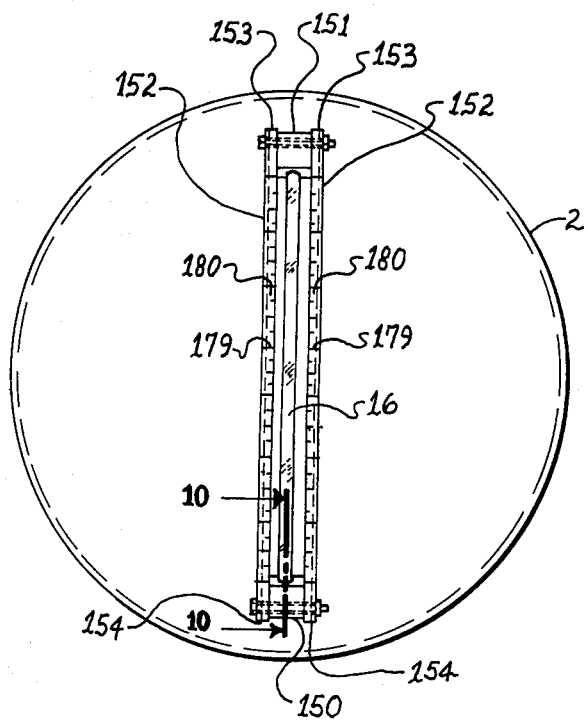
FIG. 9 is an end view of that end of the reservoir shown in FIG. 8.

FIG. 8 shows an enlarged elevational view of that end of the reservoir 2 of FIG. 1 which contains sight gauge 5 and FIG. 9 is an end view of the reservoir end shown in FIG. 8. Referring to FIGS. 8 and 9 sight gauge 5 consists of a first or lower connection member 150 in sealed fluid fllow communication with the lower lubricant carrying portion of reservoir 2 and a second or upper connection member 151 in sealed fluid flow communication with the upper or air containing portion of reservoir 2. Transparent sight gauge conduit 16 is sealingly engaged with each connection member 150 and 151 and extends between them in a substantially vertical orientation as shown in FIG. 9.

Two rigid guard members 152 each having a first end 153 and a second end 154 and a slot or opening 155 at each end are rigidly mounted at one end to connection member 150 and at their opposite end to member 151. Sight gauge conduit 16 is disposed between the guard members 152 and therefore protected from damage. Graduations or markings 179 on an outwardly facing surface 180 of each guard member 152 provide a volume measurement, such as in quarts, indicating the amount of oil in the reservoir.

Figure 10:
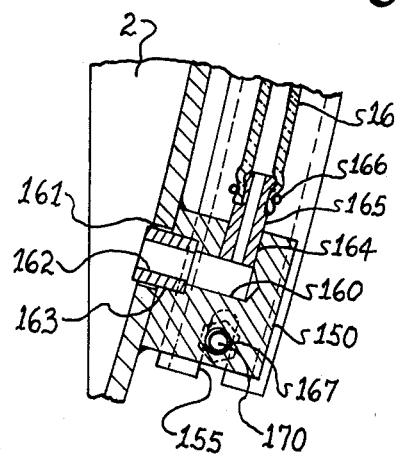
FIG. 10 is an enlarged sectional view of that portion of the reservoir indicated by the section line in FIG. 9.

FIG. 10 is an enlarged sectioned view of that portion of the reservoir indicated by the section line in FIG. 9

Connection member 150 has a fluid flow opening or bore 160 in fluid flow communication with a flow opening 161 in wall 20 of reservoir 2. A cylindrical indexing member 162 within an enlarged bore 163, coaxial with bore 160, seats within opening 161 to facilitate alignment of bore 160 with opening 161 during assembly of the connection member of the reservoir. A bore 164 is in fluid flow communication with substantially normal to bore 160 and receives, in sealing engagement, a tube connection nipple 165. Resilient transparent conduit 16, which forms the sight gauge, is engaged with member 165 and a clamp member 166 encircles and urges a portion of tube 16 radially inwardly to assure a seal between the tube 16 and the nipple member 165. Connection member 151 is identical in structure to member 150, but is oriented on the upper portion of the reservoir so that its tube connecton nipple faces downwardly toward nipple 165 on member 150. As best shown in FIG. 1, transparent conduit 16 extends between each member 150 and 151 and the fluid in the reservoir rises to the same level in conduit 16 to indicate the level of liquid in the reservoir.

An opening 167 is provided in each connective member 150 and 151. Opening 167 is not in fluid flow communication with bore 160 or 164 and is adapted to receive a guard member attachment means, such as conventional threaded bolt 170, which passes through opening or slot 155 in each guard member 152 to rigidly secure a guard member to each of two opposite sides of each connective member by placement of a nut on bolt 170, as best shown in FIG. 9.

Each guard member 152 is U or channel shaped in cross section to increase its ability to endure impact without deformation. A specific forseeable abuse of the sight gauge has been the tendency of persons handling the reservoir prior to installation to use the conduit 16 as a handle to pick up and carry the reservoir. This practice can cause unsealing of the conduit 16 from connective members 150 and 151 and actual breakage of conduit 16. Guard members 152 prevent grasping the conduit and, while not recommended as a grip, do facilitate due to their channel shape griping of the members for carrying purposes without adversely affecting the structural integrity of the reservoir.

Guard members 152 are shown curved in FIG. 8 to conform to the shape of the end of reservoir 2. However, in reservoirs in which the ends form the top and bottom of the reservoir the guard members and conduit 16 are straight to conform to the straight sides of the reservoir. Also, in such reservoirs the inlet would be in the top end, the outlet in the bottom end, and the push rod would extend between the valve and the inlet substantially along the longitudinal axis of the reservoir.

What is claimed is:

1. In a system for maintaining a desired level of oil in the crankcase of an engine; said system having a reservoir for containing oil, the improvement comprising;
    a first connective member in fluid flow communication with a lower portion of a wall of said reservoir;
    a second connective member in fluid flow communication with an upper portion of said wall of said reservoir;
    a breakable, elongated, liquid level indicating means in fluid flow communication with each said first and said second connective member for indicating visually the amount of oil in said reservoir;
    each said first and second connective member having a first side substantially normal to a surface of said reservoir wall and a second side substantially normal to said surface of said reservoir wall, each said first side and said second side of each of said connective members being substantially parallel to said liquid level indicating means;
    an opening through each of said connective members from said first side to said second side; each of said openings being out of fluid flow communication with said reservoir;
    a rigid guard member extending from said first side of said first connective member to said first side of said second connective member and a rigid guard member extending from said second side of said first connective member to said second side of said second connective member;
    each of said guard members being shaped in cross-section so as to increase the ability to withstand impact without deformation and having an opening at each of two ends; and
    attachment means passing through each of said openings in each of said guard members and through said opening in each of said connective members for rigidly attaching a guard member to each of said two sides of said connective members for being on each of two sides of said liquid level indicating means for aiding in preventing damage to said liquid level indicating means.

2. The invention as defined in claim 1 in which said liquid level indicating means is a transparent plastic tube.

3. The invention as defined in claim 1 in which said attachment means is a threaded fastener.

4. The invention as defined in claim 1 in which said guard members are U shaped in cross section.

* * * * *

UNITED STATES PATENT OFFICE
CERTIFICATE OF CORRECTION

PATENT NO. : 4,107,999
DATED : August 22, 1978
INVENTOR(S) : James R. Lang

It is certified that error appears in the above-identified patent and that said Letters Patent are hereby corrected as shown below:

Column 1, line 23, delete "crakcase" and substitute --crankcase-- therefor.

Column 5, line 41, delete "of" and substitute --a-- therefor.

Column 7, line 10, after "with" insert --and--.

Column 7, line 44, after "shape" insert --,--.

Signed and Sealed this

Thirteenth Day of February 1979

[SEAL]

Attest:

RUTH C. MASON
Attesting Officer

DONALD W. BANNER
Commissioner of Patents and Trademarks